United States Patent [19]
Smith et al.

[11] 4,102,603
[45] Jul. 25, 1978

[54] MULTIPLE SECTION ROTOR DISC

[75] Inventors: James Smith, Topsfield; Richard Paul Johnston, Peabody, both of Mass.

[73] Assignee: General Electric Company, Lynn, Mass.

[21] Appl. No.: 640,766

[22] Filed: Dec. 15, 1975

[51] Int. Cl.² .............................................. F01D 5/08
[52] U.S. Cl. .............................. 416/244 A; 416/95; 416/229 A
[58] Field of Search ................... 416/244 A, 95-96, 416/229 A

[56] References Cited

U.S. PATENT DOCUMENTS

| | | | |
|---|---|---|---|
| 2,657,008 | 10/1953 | Atkinson | 416/244 A X |
| 2,918,252 | 12/1959 | Haworth | 416/244 A X |
| 3,281,116 | 10/1966 | Keenan | 416/244 A X |
| 3,588,277 | 6/1971 | Howald | 416/96 |
| 3,609,059 | 9/1971 | Wagle | 416/95 |
| 3,982,852 | 9/1976 | Andersen et al. | 416/95 |

FOREIGN PATENT DOCUMENTS

| | | | |
|---|---|---|---|
| 1,072,351 | 12/1959 | Fed. Rep. of Germany | 416/244 A |
| 1,432,875 | 4/1976 | United Kingdom | 416/244 A |
| 891,739 | 3/1962 | United Kingdom | 416/244 A |
| 976,237 | 11/1964 | United Kingdom | 416/244 A |

Primary Examiner—Everette A. Powell, Jr.
Attorney, Agent, or Firm—Henry J. Policinski; Derek P. Lawrence

[57] ABSTRACT

A design technique, method and apparatus for containing failure of the rotors of axial flow fluid machines. A rotor disk is constructed of at least three disk sections. Each disk section is shaped such that the loading on that section will be distributed in an optimum manner from the rim to the hub of the disk. To prevent crack propagation from one disk section to another, and to minimize structural weaknesses in the disk sections, the live disk sections are bolted together in a single bolt circle. In order to reduce overall disk weight while maintaining a maximum level of failure containment, the inner disc sections are made thicker than the outer disk sections. Embodiments for the fan, compressor and turbine rotor sections of a gas turbine engine are disclosed.

22 Claims, 10 Drawing Figures

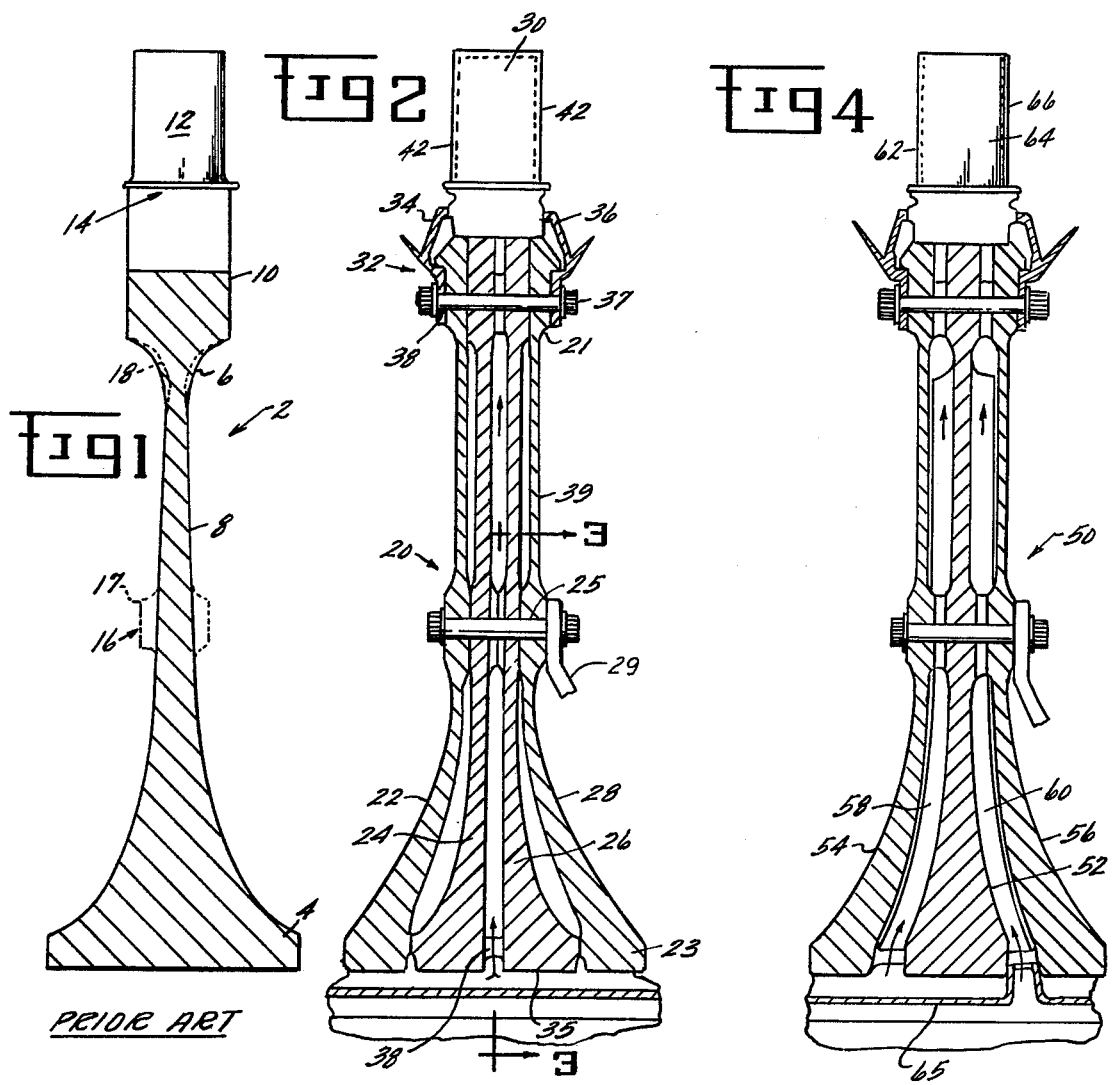
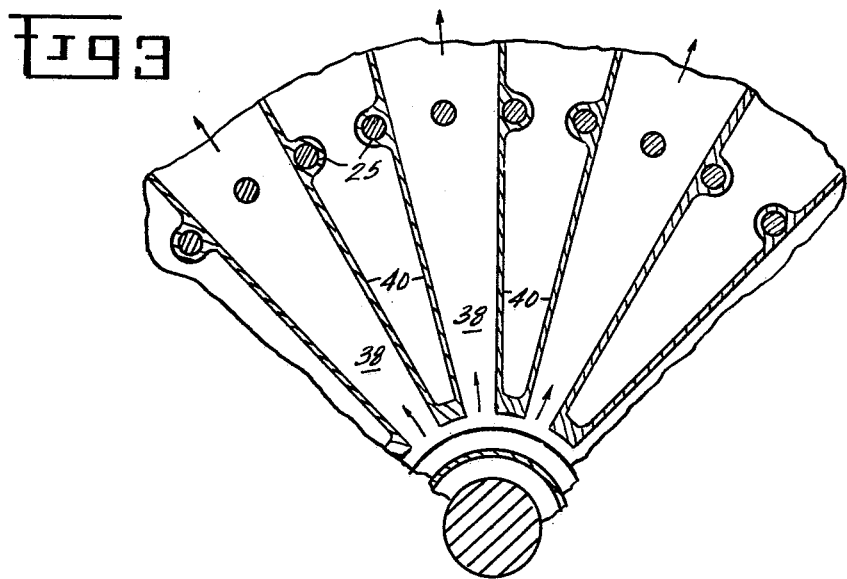

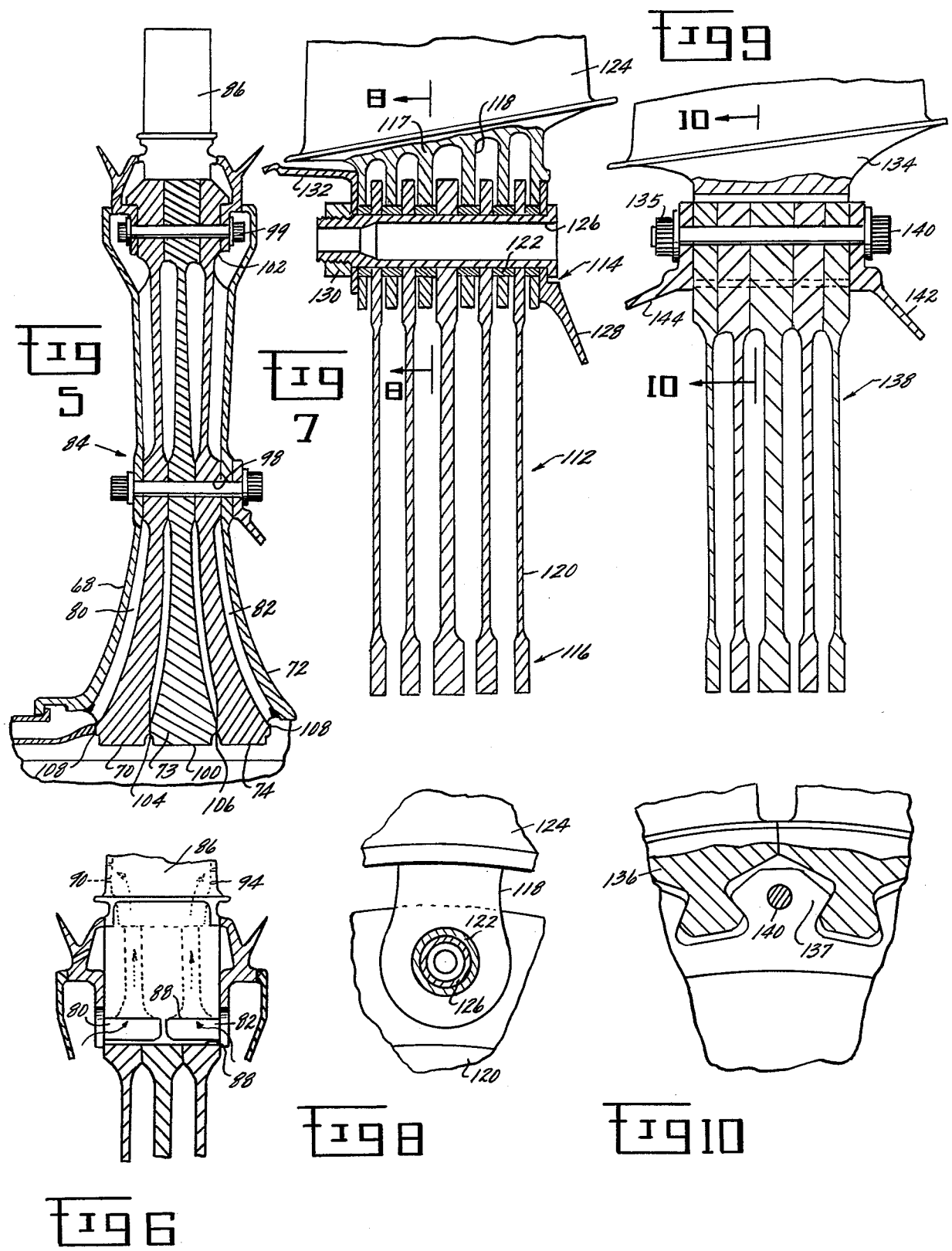

MULTIPLE SECTION ROTOR DISC

BACKGROUND OF THE INVENTION

The invention is related to rotors for axial flow fluid machines and, more particularly, to a multiple section rotor disk constructed to contain disk failure.

One of the most serious problems facing the designers of modern axial flow fluid machines is that of a major disk failure. The problem is particularly critical for aircraft gas turbine engines, wherein the failure of a single major disk may result in total engine failure due to engine structural damage caused by the pieces of a failed rotor being ingested by the engine or penetrating the engine casings. This problem has been magnified in the gas turbine engines used to power the relatively large wide-bodied aircraft recently introduced into airline service. The greater mass of the relatively large rotor disks utilized in such engines and resultant greater kinetic energy associated with the liberated rotating disk fragments is much more likely to cause total engine failure and major airframe damage.

One proposed solution for reducing failure in rotor disks has been to utilize rotor disks comprised of multiple sections. Typically, such rotor structures have been designed with sufficient extra disk sections such that in the event of a failure of any one disk section, the increased load on the remaining disk sections is not likely to make them fail. While such prior art disk structures have been shown to greatly reduce the probability of a catastrophic turbine disk failure, heretofore, they have not been widely utilized. This lack of acceptance is primarily because the additional weight and installation problems associated with such prior art structures make them extremely uncompetitive. Further prior art laminated rotor disk structures have demonstrated structural weaknesses due to propagation of disk cracks from one section to another. Similarly prior art multiple section disks which have utilized a plurality of radially displaced bolt circles for joining have required increased material for structural reinforcement of the large number of bolt holes as to make them excessively heavy.

SUMMARY OF THE INVENTION

It is, therefore, a primary object of this invention to provide an easily assembled and installed multiple section rotor disk which is far less likely to experience a catastrophic failure than prior art rotor disks and which is comparable in weight and ease of assembly to a conventional single section rotor disk.

It is a further object of this invention to provide a multiple section rotor disk capable of containing the failure of any one section.

These and other objects of the invention have been achieved in the preferred embodiments of the invention wherein a fan, compressor or turbine disk for a gas turbine engine is constructed of a plurality of disk sections. Each disk section is contoured such that the stress distribution within that disk section will be distributed in an optimum manner from the rim to the hub of the disc section; this arrangement allows each disk section to carry a share of rim load which is proportional to its rim width, thereby permitting utilization of less weight in the construction of the disk than would be required for a laminated disk in which each disk section is not shaped such that the stress distribution of each section is distributed in an optimum manner from the rim to the hub of the disk. This arrangement also permits a modification to provide cooling passages between the disk sections which may be utilized for disk and blade cooling. In order to further reduce overall disk weight while containing the failure of any disk section, the inner disk sections are made thicker than the outer disk sections. This arrangement provides a higher level of failure containment than would be exhibited by a multisection disk of identical weight and number of sections but in which all sections are of equal thickness. Where the disk sections are of equal thickness, the failure of an outer disk section is most critical since on failure of an outer section the inner section adjacent the failed outer section will have to accommodate a greater portion of the additional load than the other disk sections. Where the disk sections are of equal thickness, inner section failures are not as critical as outer section failure since the failed section will have two adjacent disks. By making the innermost sections wider and the outer sections narrower, the stress created within an inner section upon failure of an adjacent outer section may be made substantially equal to the stress created within the adjacent sections upon failure of an inner section, such that a higher level of failure containment is achieved without increasing the overall weight of the disk.

Embodiments suitable for powering the compressor, fan and turbine sections of a gas turbine engine are disclosed.

BRIEF DESCRIPTION OF THE DRAWINGS

The invention may be better understood upon reading the following description of the preferred embodiments in conjunction with the accompanying drawings wherein:

FIG. 1 is a cross-sectional view of a prior art single section turbine rotor disk with adjustment for division into a multiple section disk.

FIG. 2 is a cross-sectional view of a four-section turbine rotor disk constructed in accordance with the teachings of this invention.

FIG. 3 is a cross-sectional view taken along the line 3—3 of FIG. 2.

FIG. 4 is a cross-sectional view of three-section turbine rotor disk constructed in accordance with the teachings of this invention.

FIG. 5 is a cross-sectional view of an alternate embodiment of a three-section turbine rotor disk.

FIG. 6 is an enlarged view of an alternate embodiment for the rim portion of the disk of FIG. 5.

FIG. 7 is a cross-sectional view of a multi-section fan rotor with pin jointed blades constructed in accordance with the teachings of this invention.

FIG. 8 is an exploded cross-section view taken along the lines 8—8 of FIG. 7.

FIG. 9 is a cross-section of a multi-section fan rotor disk with dovetail jointed blades constructed according to the teachings of this invention.

FIG. 10 is an exploded cross-section view taken along the line 10—10 of FIG. 9.

DESCRIPTION OF THE PREFERRED EMBODIMENT

Referring to FIG. 1 there is shown a single section turbine rotor disk 2 constructed in accordance with the teachings of the prior art. The live disk includes a rim 10, a neck 6, a web 8 which flares out into a hub portion 4. The blades 12 are attached to the disk by dovetails (not shown) at the blade disk interface shown generally at 14. Highly stressed high pressure turbine disks are generally contoured in this manner to optimize the stress distribution within the disk. By contouring the disk in this manner, those disk areas such as the bore which are best able to withstand higher stress absorb a greater load than those disk areas such as the dovetails which are less able to absorb such high stresses. To convert the prior art disk to a disk suitable for division into a multi-disk, it is necessary to add metal in the area of the bolting circle 16, as shown by the phantom lines 17. It is also possible to remove metal from the rim area 10, as indicated by the phantom lines 18 since the loading on the rim area will be distributed between 3 or more disk sections. Note that since in a high pressure turbine disk the rim area 10 is not self-supporting but must be supported by the hub, any material reduction here is most beneficial in reducing disk weight.

Referring to FIGS. 2 and 3, therein is shown a multiple section rotor disk 20 with four disk sections 22, 24, 26 and 28. Each of the disk sections 22, 24, 26 and 28 is contoured in the manner of the modified disk of FIG. 1 such that the combined thickness of the sections at any point along a radial cross-section of the disk 20 will be substantially the same as the thickness of the modified disk of FIG. 1 at the corresponding radial cross-section. This permits each disk section to carry its proportional share of the rim load, maintains an optimum stress distribution from the rim 21 to the hub 23 of each disk section, and eliminates unnecessary material from the disk. The blades 30 are secured to the disk 20 by dovetails (not shown). End sealing plates 34 and 36 are secured to the disk by means of a plurality of bolts 37 placed in a bolt circle 38 extending through the root portions of the blade 30 in the region 32 radially displaced outward from the live portion of the disk 20.

In order to permit joining of the disk sections, the web portion 39 of each disk section is enlarged to accommodate a circle of radially aligned bolt holes 25 in each disk section. Because the live portions (i.e. those portions extending between the outside continuous diameter of the rim 21 to the disk bore 35) of the rotor disk sections are joined with a single bolt circle without the use of laminate or a plurality of bolt circles, the multi-section disk of this invention avoids the crack propagation problems associated with laminated disk structures and also is able to eliminate additional material which would be required for a multi-section disk structure having a plurality of bolt circles for joining the live portions of the disk section. The bolt circle 25 also provides a convenient means for joining a drive shaft 29 to the turbine disk 20.

In order to provide the maximum degree of containment for failure of any disk section without unnecessary weight, the relative thickness between the inner and outer disk sections is optimized such that the failure of an outer disk section results in substantially the same loading on the most highly loaded inner disk section as will be imposed on the most highly loaded outer disk sections in the event of the failure of an inner disk section. This requires that the inner disk section be greater in thickness than the outer disk section. The optimum relative thickness may be computed utilizing stress analysis formula well known to those skilled in the art.

In accordance with another feature of this invention, the spaces between disk sections provide a convenient means for cooling the turbine disk and blade. Thus, as best seen in FIGS. 2 and 3, a plurality of circumferentially spaced cooling passages 38 may be provided intermediate the inner disk sections 24 and 26. It is preferred that the cooling passages 38 be alternated with filled areas 40 in order to provide an abutment face to absorb the high compressive load experienced at high rotational speeds of the disk 20. Cooling air from a suitable source such as the compressor for the gas turbine engine flows through the passages 38 into the blade 30 through a suitable aperture (not shown) in the blade dovetail and out a plurality of cooling ports 42 spaced around the edges of the blade 20.

Alternatively, dual source cooling may be provided. Referring to FIG. 4, therein is shown a three-section rotor disk 50 including an inner section 52 disposed between thinner outer sections 54 and 56. In order to permit cooling from dual sources, two separate systems of cooling passages are provided. Thus, a plurality of cooling passages 58 are provided intermediate the disk sections 54 and 52 and a second system of passages 60 are provided intermediate the disk sections 56 and 52. Air directed to the passages 58 is discharged through the cooling ports 62 in the leading edge of the blade 64 while air directed to the passages 60 is discharged through a plurality of cooling ports 66 in the aft trailing edge of the blade 64. The cooling passages 58 are separated from the cooling passages 60 by an annular wall member 65 such that each of the cooling passages 58 and 60 may be placed in flow communication with different sources of cooling air. As in the embodiment of FIG. 3, the cooling passages 58 and 60 are alternated with filled areas to provide abutment faces between the disk sections. Dual source cooling provides for a more efficient cooling of the turbine blade. Thus a lower pressure cooling flow may be directed through the passages 60 than is directed to the passages 58 since the pressure outside the leading edge 62 of the blade 64 in engine operation will be greater than the pressure at the trailing edge 66 of the blade 64. Consequently the total cooling flow may be reduced to less than if the same cooling flow were discharged through the leading and trailing edges of the blade 64 since such a flow would have to exceed the pressure of the fluid outside the leading edge 62.

Referring to FIGS. 5 and 6, therein is shown an alternate embodiment for the three-section disk of this invention in which cooling passages are created by providing a first pumping plate 68 adjacent an outer disk section 70 and a second pumping plate 72 adjacent an outer disk section 74. Pumping plates 68 and 72 are spaced apart from the respective outer disk section 70 and 74 to provide a plurality of cooling passages 80 and 82 respectively alternating with abutment faces not shown for cooling of the disk 84 and blade 86. Cooling passages 80 and 82 are separated at the dovetail portion of the disk 84 by a loose partition 88 as best seen in FIG. 6 such that the cooling flow through the passage 80 is directed to the plurality of apertures 90 in the leading edge of the blade 86 and cooling flow through the passage 82 is directed to the plurality of apertures 94 in the trailing edge of the blade 84. The pumping plates 68 and 72 are secured to the disk 86 at the bolt circle 98 used to join the live disk sections and at the bolt circle 99 used to join the rim sections.

The embodiment of FIGS. 5 and 6 also illustrates another alternative feature of the multiple section rotor disk of this invention. Thus, the web portions of the outer disk sections 70 and 74 extending between the bolt holes 98 and the hub 100 are tapered away from the thicker inner disk section 73 in order that the centrifugal pull on both outer disk sections 70 and 74 will cause a compressive force at the hub 100 to thereby maintain the joint between disk sections in close contact at the hub 100. Similarly, the web portions of the outer disk sections 70 and 74 between the bolt holes 98 and the rim 102 are tapered away from the inner disk section 73 such that the centrifugal pull on the outer disk sections will also create a compressive force at the rim 102 in order to maintain the joints between the disk section at the rim 102 in close contact. Additional material is provided in the regions 104 and 106 between the disk sections at the hub 100 in order to provide wear surfaces to protect the hub from minute movement between disk sections which may be experienced during operation of the disk 84.

Similarly, the portion of the pumping plates 68 and 72 extending intermediate the bolt circle 98 and rim 102 are tapered away from the inner disk section 73 such that centrifugal pull on the blade 86 will provide a compressive joining force at the rim 102. The portion of the pumping plates 68 and 72 intermediate the bolt circle 98 and the hub 100 are also tapered away from the inner disk section 73 such that the centrifugal pull on the blade 86 will similarly provide a compressive joining force at the hub 100. Additional material is provided at the interfaces between the pumping plates 68 and 72 and the outer disk sections 70 and 74 in the regions 108 of the hub 100 in order to provide wearing surfaces to protect the hub 100 during operation of the disk 84.

Referring to FIGS. 7, 8, 9 and 10, therein is illustrated embodiments of the invention for multiple section disks suitable for use as the fan or compressor rotor sections of a gas turbine engine. Shown in FIGS. 7 and 8 is a multi-section disk 112 with pin joint blade root rixings. The compressor or fan rotor disks differ from the turbine disks of FIGS. 1 through 6 in that the width of the rim section 114 is generally greater than the width of the hub 116. The blade 124 includes a blade platform 117 having a plurality of spaced pin joint tangs 118 extending therefrom and alternating between disk sections 120. The inner blade tangs are preferably made progressively thicker than the outer blade tangs to enhance failure containment in the same manner as the disk 112. The disk sections 120 are separated by a plurality of spacer bushings 122 which also provide means to retain the disk blade 124. A plurality of clamping bolts 126 in a single bolt circle pass through a plurality of rdially aligned apertures in the spacer bushings 122, blade tangs 118, disk section 120 and driving shaft 128 and are secured by means of a plurality of clamping nuts 130. A nose fairing 132 may also be held at the same bolt circle. A considerable weight advantage is achieved by combining disk joining, shaft mounting and blade retention with a common bolt circle at the rim. In prior art designs, holes in the disk rim encase pins for blade retention only and the driving shaft is separately attached to the rotor.

In order to prevent crack propagation from one disk to another, the disk is bolted or clamped rather than bonded or welded. As in the turbine rotor embodiment, the innermost disk sections may be made wider than the outermost disks so as to equalize failure containment. Each disk section 120 is contoured such that the loading thereon will be distributed in an optimum manner from the rim to the hub of the disk 116.

Referring to FIGS. 9 and 10, there is shown an alternate embodiment for a rotor disk suitable for construction of the compressor or fan rotor of a gas turbine engine. In this embodiment, dovetail blade retention is employed. Thus, there is shown a blade platform 134 integral with a dovetail 136 (as best seen in FIG. 10) mating with a multiple section disk 138. A plurality of clamping bolts 140 and nuts 135 are spaced between each blade dovetail 136 in the disk dovetail post 137 outside the area of the live disk and secure the rotor system to the shaft 142. The clamping bolts and nuts also support the nose fairing 144. As in the other embodiments, the innermost disk sections may be made larger than the outer disk sections in order to provide maximum containment of failure with a minimum of disk sections and/or redundant weight.

While embodiments of 3, 4 and 5 disk sections have been shown, a greater number of sections may be utilized. Generally the failure containment properties of the disk increase as the number of sections utilized increase. Regardless of the number of disk sections employed, in order to minimize weight and cost, the disk section may be made progressively smaller in thickness from the thickest innermost section to the thinnest outermost sections, and all sections should be integrally shaped to optimize the stress distribution within each disk section from the rim to the hub of that disk section.

Therefore, having described a preferred embodiment of the invention, though not exhaustive of all possible equivalents, what is desired to be secured by Letters Patent of the United States is claimed below;

1. A rotor disk for turbomachinery comprising at least three discrete sections the innermost sections being progressively thicker than the outermost sections and all sections being of such a thickness that the stress created within an inner section upon failure of an adjacent outer section is substantially equal to the stress created in an outer section upon failure of the adjacent inner section.

2. The rotor disk of claim 1 wherein each disk section comprises a rim portion of generally rectangular cross-section which extends into a tapered neck portion followed by a web portion which gradually flares into a hub portion of generally rectangular cross-section whereby the stress distribution within that disk section is distributed in an optimum manner throughout the disk section during rotation of the rotor disk.

3. The rotor disk of claim 2 wherein the portions of each disk section extending from the neck to the hub of the disk section are joined to the corresponding portion of the other disk sections by a plurality of circumferentially spaced bolts each extending through a respective aperture in each disk section wherein the apertures in each disk section are circumferentially spaced in a single bolt circle through the web portion of the disk section and aligned with corresponding apertures in the other disk sections.

4. The rotor disk of claim 3 wherein the web portion of each disk section is enlarged in the area surrounding the apertures therein.

5. The rotor disk of claim 3 wherein the web portion of each outer disk section extending between the bolt circle and the hub is tapered away from its respective adjacent inner disk section such that centrifugal pull on the outer disk sections during rotation of the rotor disk creates a compressive joining force at the rotor disk hub.

6. The rotor disk of claim 3 wherein the web portion of each outer disk section between its respective bolt circle and rim is tapered outwardly away from its respective adjacent inner disk section such that centrifugal pull on the outer disk sections during rotation of the rotor disk creates a compressive joining force at the rotor disk rim.

7. The rotor disk of claim 5 wherein additional material is provided intermediate the hub portion of the outer disk sections and the hub portion of their respective adjacent inner disk sections in order to provide wear surfaces to protect the rotor disk hub from minute movement between disk sections during rotation of the rotor disk.

8. The rotor disk of claim 3 further comprising a first pumping plate adjacent an outer disk section and separated therefrom by a plurality of curcumferentially spaced first cooling passages which are alternately spaced between a plurality of circumferentially spaced first abutment faces and a second pumping plate adjacent the other outer disk section and separated therefrom by a plurality of circumferentially spaced second cooling passages which are alternately spaced between a plurality of circumferentially spaced second abutment faces.

9. The rotor disk of claim 8 wherein the first and second cooling passages are in flow communication with separate sources of cooling flow of differing pressures.

10. The rotor disk of claim 8 wherein the pumping plates are joined to the disk sections by means of the circumferentially spaced bolts which extend through a plurality of circumferentially spaced apertures in a single bolt circle in each pumping plate.

11. The rotor disk of claim 10 wherein that portion of each pumping plate which extends from its bolt circle to the hub of the rotor disk is tapered outwardly away from its respective adjacent outer disk section such that centrifugal pull on the pumping plates during rotation of the disk creates a compressive joining force at the rotor disk hub.

12. The rotor disk of claim 11 wherein additional material is provided intermediate the hub portion of each outer disk section and the adjacent pumping plate in order to provide wear surfaces to protect the rotor disk hub from minute movement during rotation of the disk.

13. The rotor disk of claim 11 wherein that portion of each pumping plate which extends from its bolt circle to the rim of the rotor disk is tapered outwardly away from its respective adjacent outer disk section such that centrifugal pull on the pumping plate during rotation of the rotor disk creates a compressive joining force at the rotor disk rim.

14. The rotor disk of claim 1 wherein passages for cooling air are provided intermediate two or more disk sections.

15. The rotor disk of claim 14 wherein the rotor disk comprises four sections and the two inner sections are separated by a plurality of circumferentially spaced cooling passages alternating between circumferentially spaced abutment faces.

16. The rotor disk of claim 14 wherein the rotor disk comprises three sections and the inner section is separated from a first outer section by a plurality of circumferentially spaced first cooling passages which are alternately spaced between a plurality of circumferentially spaced first abutment faces and separated from the other outer section by a plurality of curcumferentially spaced second cooling passages which are alternately spaced between a plurality of circumferentially spaced second abutment faces.

17. The rotor disk of claim 16 wherein the first and second cooling passages are in flow communication with separate sources of cooling flow of differing pressures.

18. The rotor disk of claim 1 wherein the disk sections are joined to a blade having a plurality of spaced tangs extending therefrom and wherein the disk sections are alternately spaced between the blade tangs and separated therefrom by a plurality of spacer bushings.

19. The rotor disk of claim 18 wherein the inner blade tangs are progressively thicker than the outer blade tangs.

20. The rotor disk of claim 19 wherein the blade tangs, disk sections and spacer bushings are joined together by means of a plurality of clamping bolts circumferentially spaced in a single bolt circle and extending through a plurality of circumferentially spaced and radially aligned apertures in the blade tangs, disk sections and spacer bushings.

21. The rotor disk of claim 20 wherein a driving shaft and nose fairing are secured to the rotor disk by means of the clamping bolts.

22. The rotor disk of claim 1 wherein the disk sections are joined to a blade by dovetail means and a plurality of clamping bolts extending through the dovetail means and also securing a nose fairing to the disk.

* * * * *